United States Patent [19]
Copeland et al.

[11] Patent Number: 5,835,186
[45] Date of Patent: Nov. 10, 1998

[54] PLANO-ASPHERIC SPECTACLE LENS

[76] Inventors: Victor L. Copeland, P.O. Box 1926; Steven G. Pratt, P.O. Box 2665, both of Rancho Santa Fe, Calif. 92067

[21] Appl. No.: 798,157

[22] Filed: Feb. 10, 1997

[51] Int. Cl.$^6$ .................................................. G02C 7/02
[52] U.S. Cl. ............................................ 351/159; 351/163
[58] Field of Search .................................. 351/159, 167, 351/163

[56] References Cited

U.S. PATENT DOCUMENTS 5,054,904  10/1991  Bristol ...................................... 351/167

*Primary Examiner*—Scott J. Sugarman
*Attorney, Agent, or Firm*—Frank D. Gilliam

[57] ABSTRACT

A plano-aspheric spectacle lens that is particularly beneficial under night and low-light conditions and/or by those who have had refractive surgery. A first refractive surface of the lens, preferably the back or concave side, has an aspheric surface with a power of from about minus 0.20 to minus 0.37 diopters and a central, generally circular, spherical area having no power and a diameter of from about 1 to 5 mm. If any corrections are required for eye anomalies such as refractive error, astigmatism or the like, those corrections are applied to the lens surface opposite the plano-aspheric surface, preferably the back or concave surface.

2 Claims, 1 Drawing Sheet

PLANO-ASPHERIC SPECTACLE LENS

BACKGROUND OF THE INVENTION

This invention relates to spectacle lenses and, more specifically, lenses generally having no central refractive power but that improve low light vision such as at night, with sunglasses, or post-refractive surgery night vision.

Most aspheric corrective surfaces used in spectacle lenses have the purpose of reducing the thickness and weight of the lenses. Such lenses may change in refractive power from the center to periphery as much as four diopters.

The cornea of most eyes is naturally aspheric and corrects most of the eye's inherent spherical aberration. Persons who have had corneal refractive surgery no longer have their natural aspheric cornea. This increases the eye's spherical aberration as the pupil dilates under low-light conditions. Consequentially, vision decreases.

Many people with 20/20 unaided vision complain of poor vision when wearing sunglasses. Their eyes have excess spherical aberrations that cause this poor vision. This is called "sunglass myopia". These persons generally also complain of poor night vision as well and have what is called "night myopia". Post-refractive surgery patients regularly complain that their vision is not as clear at night or under low light conditions as it once was.

Many people who perform large amounts of near work for extended periods, such as reading or computer screen viewing, have vision that is decreased for distant objects for a period of time. This condition is sometimes called "induced myopia" and is due to an slight amount of residual accommodation that results in light being focused in front of the retina.

Thus, there is a continuing need for spectacle lenses that can alleviate problems with night vision and induced myopia, in particular for those who have had refractive surgery and for those who do not otherwise require refractive correction.

SUMMARY OF THE INVENTION

The above objects, and others, are overcome by a plano-aspheric spectacle lens with the peripheral area of the lens having a power from about minus 0.20 to minus 0.37 diopters and a central, generally circular, spherical area having no power and a diameter of from about 1 to 5 mm. The plano-aspheric surface may be placed on the back, concave, surface of the lens or the front, convex, surface. Where the user does not require other correction, these lenses will primarily benefit the user under night or other low light conditions.

Where the user requires refractive correction for anomalies such as astigmatism, plano-aspheric correction can be incorporated in the lens. The plano-aspheric surface is beneficial to such a person at all times, with primary benefit under low-light conditions.

Where the user requires a correction, the central 1 to 5 mm diameter area would be of the required corrective power and the area directly peripheral to this central area would be of an additional −0.20 to −0.37 (minus) power. For example, where a person requires a −2.00 correction, the correction in the central area would be −2.00 and in the peripheral area would be −2.25 to −2.37.

If desired, the lens can contain any suitable additives, such as ultraviolet and visible light absorbers, additives that darken the lens under intense light conditions, etc.

The lens may have any desired shape. Spectacles containing these lenses should be carefully aligned so that the central spherical area is centered over the cornea.

It is, therefore, an object of this invention to provide a spectacle lens that improves a user's low-light and night vision, overcoming night myopia. Another object is to provide a spectacle lens correcting for loss of natural cornea aspheric characteristics resulting from corneal refractive surgery. A further object is to provide a spectacle lens particularly useful in night vision glasses and sunglasses. Still another object is to provide spectacle lens overcoming sunglass myopia and residual accommodations.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
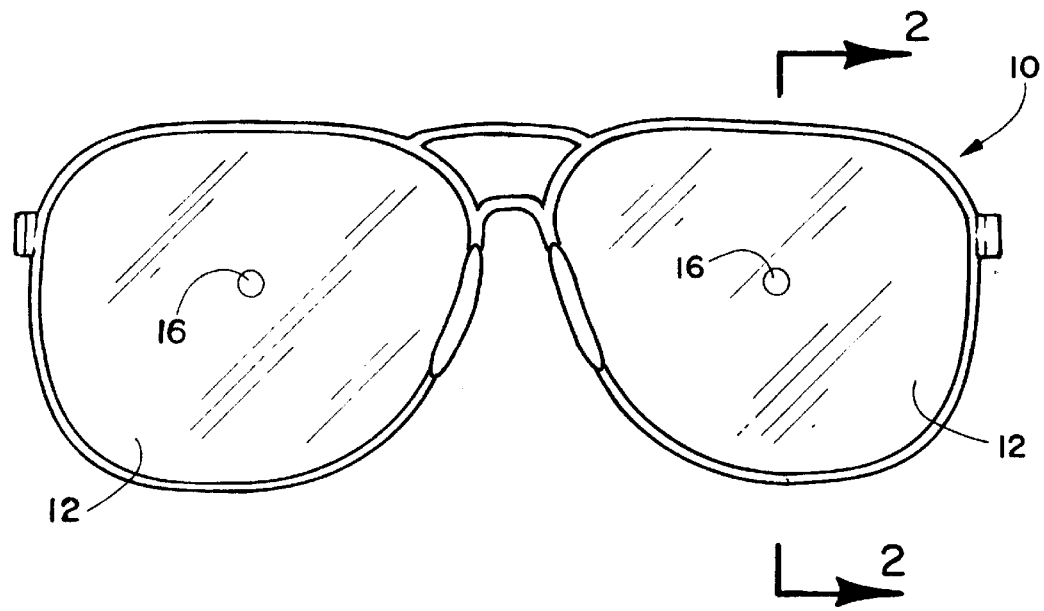
FIG. 1 is a front elevation view of a pair of spectacle lens of this invention.
Figure 2:
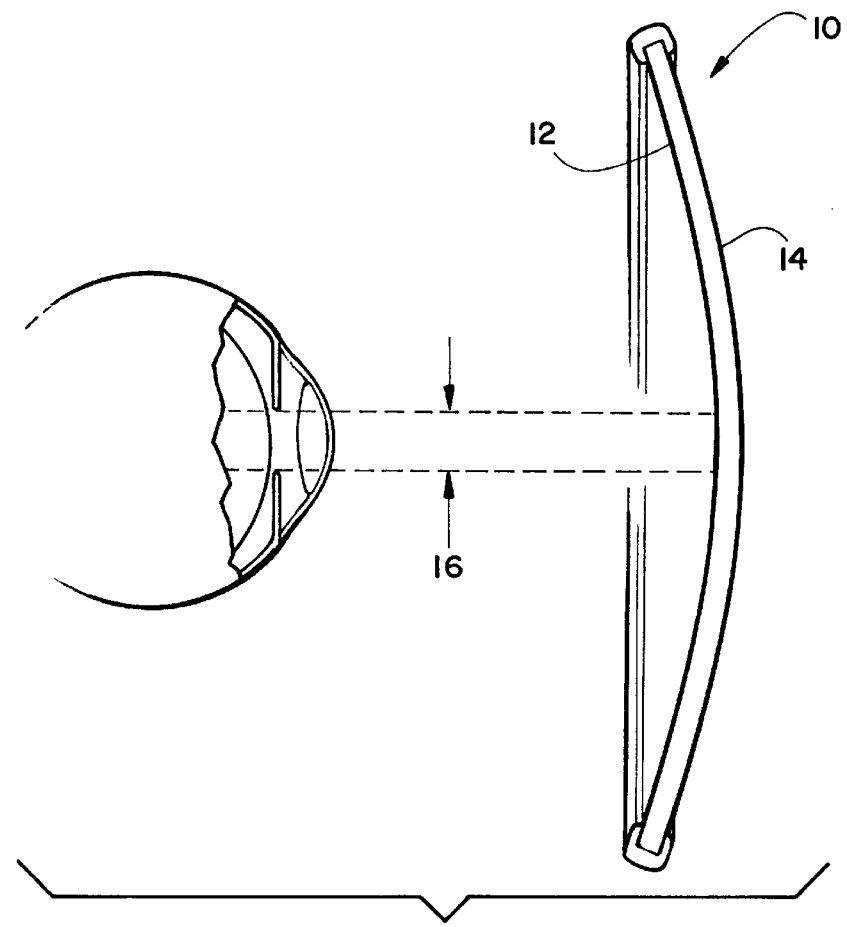
FIG. 2 is an elevation view of a partially cut-away eye and a cooperating spectacle lens.

Referring to FIGS. 1 and 2, there is seen a typical pair of spectacles with each lens 10 having a shape corresponding to eyeglass frames selected by the user. One surface, preferably the back or concave side 12, is aspheric, with a power of from about minus 0.20 to minus 0.37 diopters.

A centrally located, generally circular, area 16, (indicated by a circle in FIG. 1 and the space between arrows in FIG. 2) is a plano, spherical area having no power and a diameter of from about 1 to 5 mm. When fitting glasses using this lens adjacent to an eye 18, this plano area will be carefully located directly over the center of the cornea 20. In the finished lens, this area will not be visible without very careful examination of the lens. This plano area is particularly beneficial because it is similar in diameter to the wearer's pupil in normal daylight. When the pupil dilates in reduced illumination the minus power corrects for the induced spherical aberration of the eye.

The user will benefit from wearing the spectacles containing the novel lens primarily under night or low-light conditions, although the spectacles can be worn at all times.

Lens 10 may be formed from any suitable transparent material, such as glass or plastic. If desired, any suitable additive, such as ultraviolet or visible light absorbing materials, material that darken temporarily when exposed to intense light or the like may be used.

While certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

We claim:

1. A plano-aspheric spectacle lens for reducing myopia induced by low light levels at the eyes which comprises:

a substantially transparent spectacle lens;

a concave, back, refractive surface on said lens;

said concave, back, refractive surface having a single, uniformly aspheric surface with a power of from about minus 0.20 to minus 0.37 diopters;

said concave, back, refractive surface having a substantially central, generally circular, plano-spherical area, said central area having no power and a diameter of from about 1 to 5 mm;

a convex, front, refractive surface having all necessary corrections.

2. The plano-aspheric spectacle lens for reducing myopia induced by low light levels at the eyes according to claim 1 wherein said front surface has no correction and further including ultraviolet and visible light absorbing material dispersed through said lens.

\* \* \* \* \*